C. H. REEVE.
KEYBOARD INDICATOR.
APPLICATION FILED DEC. 11, 1914.

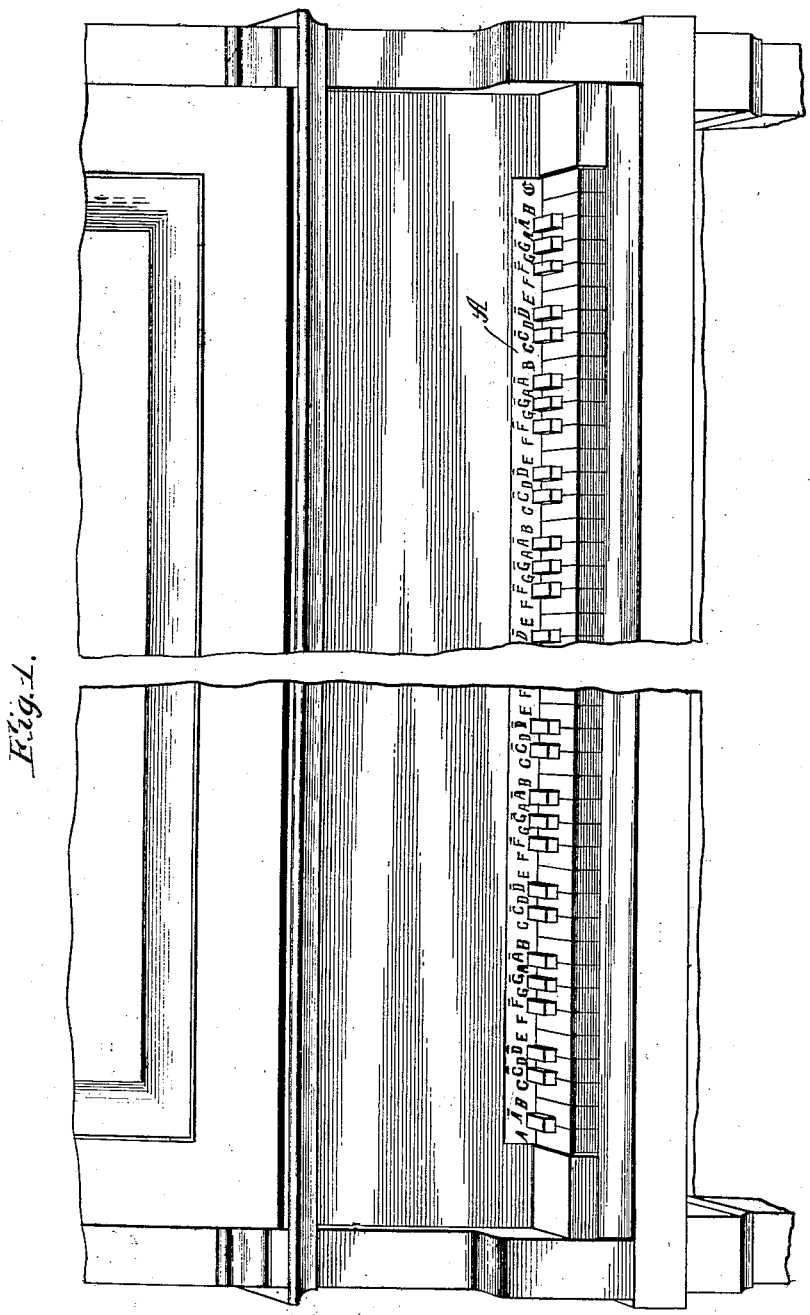

1,293,924.

Patented Feb. 11, 1919.
2 SHEETS—SHEET 2.

UNITED STATES PATENT OFFICE.

CARLTON H. REEVE, OF CHICAGO, ILLINOIS.

KEYBOARD-INDICATOR.

1,293,924.  Specification of Letters Patent.  Patented Feb. 11, 1919.

Application filed December 11, 1914. Serial No. 876,669.

*To all whom it may concern:*

Be it known that I, CARLTON H. REEVE, citizen of the United States, residing at Chicago, in the county of Cook and State of Illinois, have invented certain new and useful Improvements in Keyboard-Indicators; and I do hereby declare the following to be a full, clear, and exact description of the invention, such as will enable others skilled in the art to which it appertains to make and use the same.

This invention relates to a key-board guide for pianos and organs which is particularly adapted for use in connection with musical scores written by substituting letters of the alphabet for the note-symbols usually employed.

The object of the invention is to provide a key-board guide having alphabetical characters printed or otherwise displayed thereon which correspond in number with the keys of the key-board and register therewith and in which said characters correspond in relative elevation substantially with the relative elevations of the white and black keys of said key-board.

My invention will be readily understood from the following specification, reference being had to the accompanying drawings in which:

Figure —1— is a fragmentary view in front elevation of a piano and the keyboard thereof showing a key-board guide disposed thereon which embodies my invention.

Fig. —2— shows in two fragmentary views, parts of the keyboard guide on an enlarged scale indicating the differential coloring of the octaves indicated thereon.

Fig. —3— is an exemplary illustration of a bar of music as printed in the sheet music constituting a part of the invention and adapted to be used in conjunction with the key-board guide illustrated in Fig. —2—.

In Fig. —3— I have shown an example of alphabetical music scores in which alphabetical letters are used in place of the usual note-symbols, said letters being varied in color to denote the octave of the key-board in which they are located instead of being varied in elevation as in the standard or usual music publications.

The present invention relates only to those structural features or characteristics by which the aforesaid particular object is attained.

In the alphabetical scores the keys of the key-board are designated only as "white" and "black" keys instead of "naturals"—"sharps" or "flats". The symbols indicating the black keys are distinguished from those indicating the white keys by a distinguishing characteristic, preferably a "dash" over the letter or other symbol. On the key-board guide the same symbols are used and those denoting and registering with the black keys are similarly distinguished from those indicating and registering with the white keys.

The said key-board guide is usually placed to rest along its lower edge on the white keys of the key-board between the rear ends of the black keys and the board at the rear ends of the keys against which it rests.

The said guide may be made of any suitable material but is preferably made of a stiff white paper. The strip A of this material has symbols printed thereon which consist of capital letters of the alphabet, there being one symbol for each white and each black key of the key-board, said symbols being carefully spaced apart to coincide with the spacing of the keys indicated thereby and with which they are adapted to register. Those symbols indicating and registering with the black keys are disposed at higher elevations than those indicating the white keys, thus not only rendering them fully visible but giving them an added or accentuated prominence on the guide. Each of the elevated symbols is surmounted or capped by a dash which distinguishes the same from the symbols indicating the white keys.

In practice it has been found that elevating the symbols for the black keys above those for the white keys renders it far easier for the performer to locate the notes on the key-board in reading the score, that is, it greatly decreases the liability of confusion and error.

I claim as my invention:

1. A key designation strip adapted to be placed upon and be supported by the keys of a piano or similar instrument, and carrying letter designations for the several keys spaced to register with the keys, the designations of adjacent octaves being shown in contrasting colors.

2. A key designation strip adapted to be placed upon and be supported by the keys of a piano or similar instrument, and carrying letter designations for the several keys spaced to register with the keys, the designations of the keys for the several successive usual octave divisions being differently colored and corresponding with the designations used in musical scores.

In testimony whereof I have signed my name in presence of two subscribing witnesses.

CARLTON H. REEVE.

Witnesses:
  JOHN V. FILIPPINI,
  HUGH McCURDY.